(12) United States Patent
Morgan

(10) Patent No.: US 7,150,221 B2
(45) Date of Patent: *Dec. 19, 2006

(54) MULTIPLE CAKE BAKING ASSEMBLY

(76) Inventor: Fletcher Morgan, 4990 Coquina Key Dr., SE., St. Petersburg, FL (US) 33705

( * ) Notice: Subject to any disclaimer, the term of this patent is extended or adjusted under 35 U.S.C. 154(b) by 235 days.

This patent is subject to a terminal disclaimer.

(21) Appl. No.: 10/766,007

(22) Filed: Jan. 29, 2004

(65) Prior Publication Data
US 2004/0182257 A1 Sep. 23, 2004

Related U.S. Application Data

(63) Continuation-in-part of application No. 10/424,764, filed on Apr. 29, 2003, and a continuation-in-part of application No. 10/365,422, filed on Feb. 13, 2003, and a continuation-in-part of application No. 10/330,221, filed on Dec. 30, 2002, now Pat. No. 6,851,352, which is a continuation-in-part of application No. 10/302,903, filed on Nov. 25, 2002.

(51) Int. Cl.
*A47J 43/18* (2006.01)

(52) U.S. Cl. .............................. 99/428; 99/439; 99/440; 99/442; 99/433

(58) Field of Classification Search .................. 99/428, 99/439, 440, 442, 432, 433, 426; 249/120, 249/121, 119, DIG. 1
See application file for complete search history.

(56) References Cited

U.S. PATENT DOCUMENTS

| | | |
|---|---|---|
| 1,487,906 A | 3/1924 | White et al. |
| 1,596,331 A | 8/1926 | Bassett |
| 1,728,064 A * | 9/1929 | Johnson ........................ 99/375 |
| 1,852,966 A | 4/1932 | Green |
| 2,135,342 A | 11/1938 | Jackson |
| 2,156,145 A | 4/1939 | Cavett et al. |
| 2,290,396 A * | 7/1942 | Webster ..................... 249/66.1 |
| 2,472,620 A | 6/1949 | Rhodes et al. |
| 3,141,400 A | 7/1964 | Powers |
| 3,141,440 A | 7/1964 | Powers |
| 3,296,956 A | 1/1967 | Turner |
| 3,831,507 A | 8/1974 | Wheaton |
| 4,220,134 A | 9/1980 | Snyder |
| 4,812,323 A | 3/1989 | Savage |
| 5,191,830 A * | 3/1993 | Jacobson ...................... 99/439 |
| 5,226,352 A | 7/1993 | Savage |
| 5,232,609 A | 8/1993 | Prevost et al. |
| 5,400,698 A | 3/1995 | Savage |
| 5,425,527 A | 6/1995 | Selbak |
| 5,514,402 A | 5/1996 | Williams |
| 5,528,981 A | 6/1996 | Pettit |
| 5,601,012 A * | 2/1997 | Ellner ......................... 99/428 |
| 5,948,313 A | 9/1999 | Cahen |

* cited by examiner

Primary Examiner—Reginald L. Alexander
(74) Attorney, Agent, or Firm—John S. Hale; Gipple & Hale

(57) ABSTRACT

An assembly for forming multiple individual compound desserts in a predetermined dome shape including a base tray having a plurality of recessed cavities to form a base for said compound dessert. A rack and a plurality of dome shaped bowl assemblies secured in a fixed position to said rack. Each bowl assembly is formed with a closed semi-spherical end and an open end forming a cavity, and a cover member which is mounted over said open end, the cover member having an inner bowl extending therefrom which extends into the cavity.

8 Claims, 7 Drawing Sheets

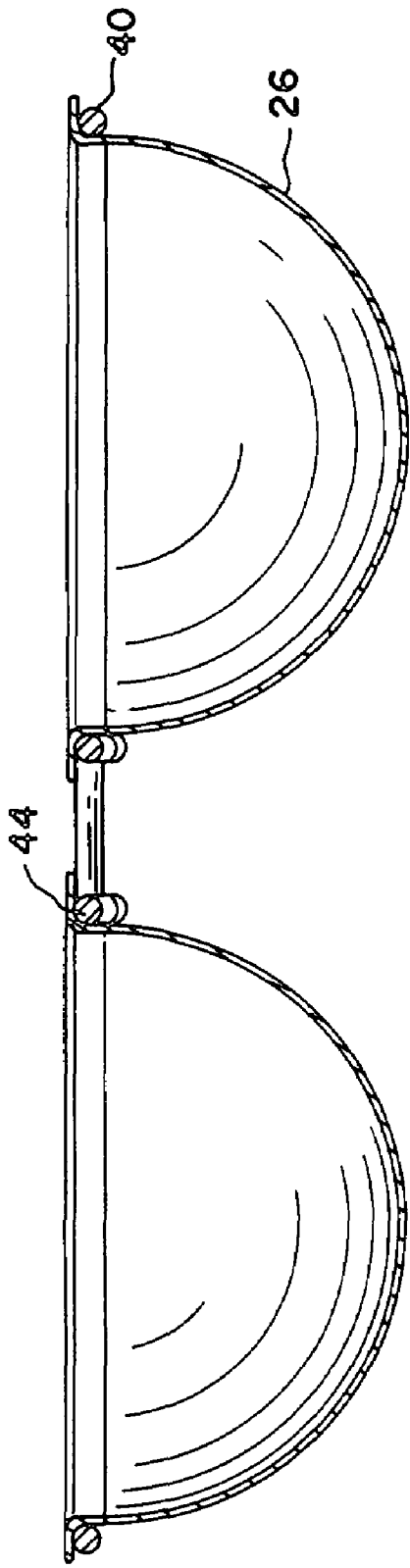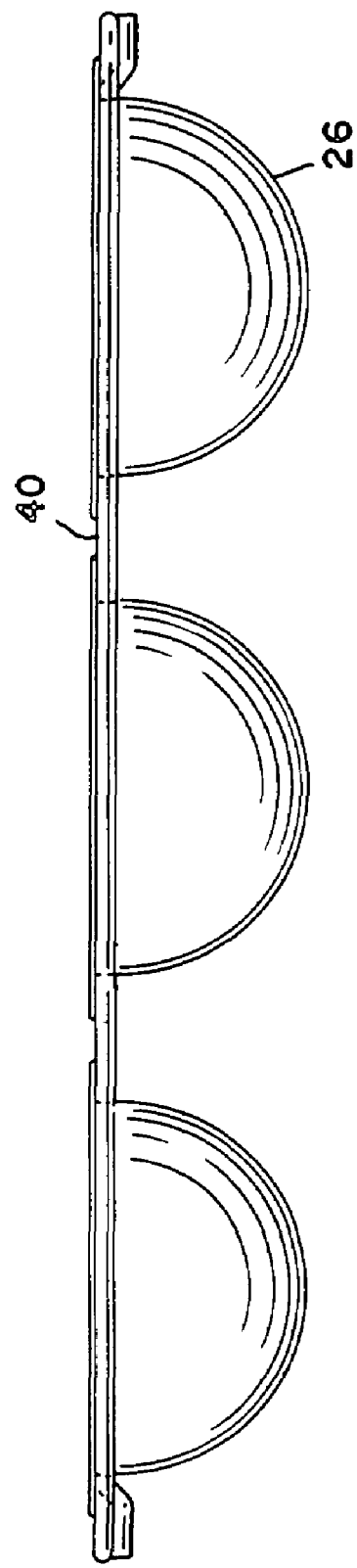

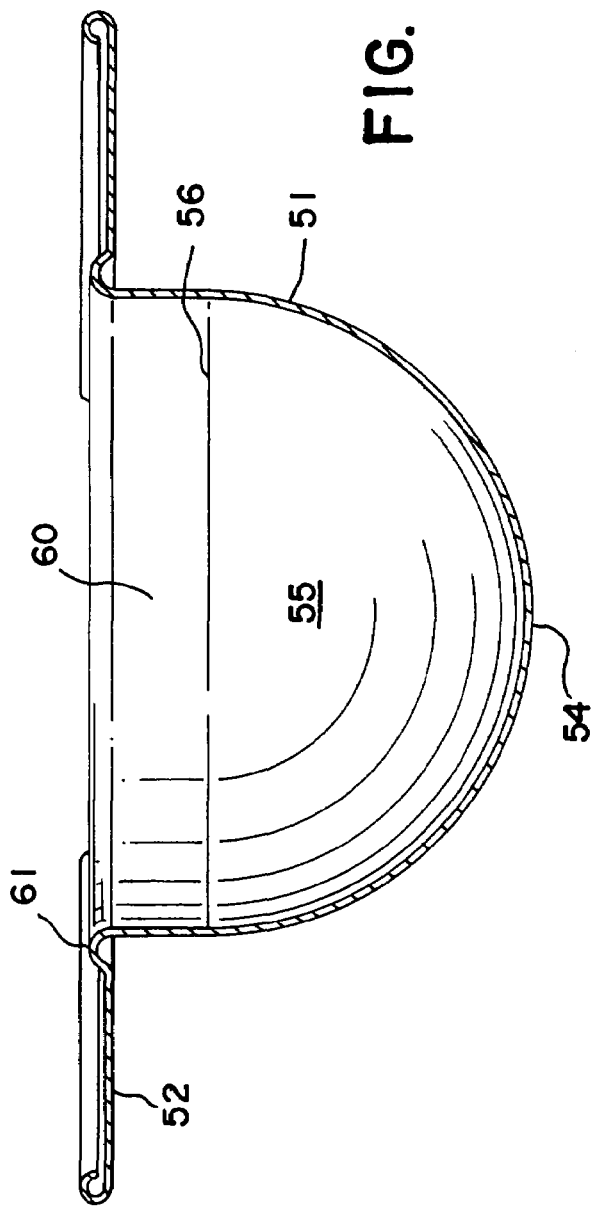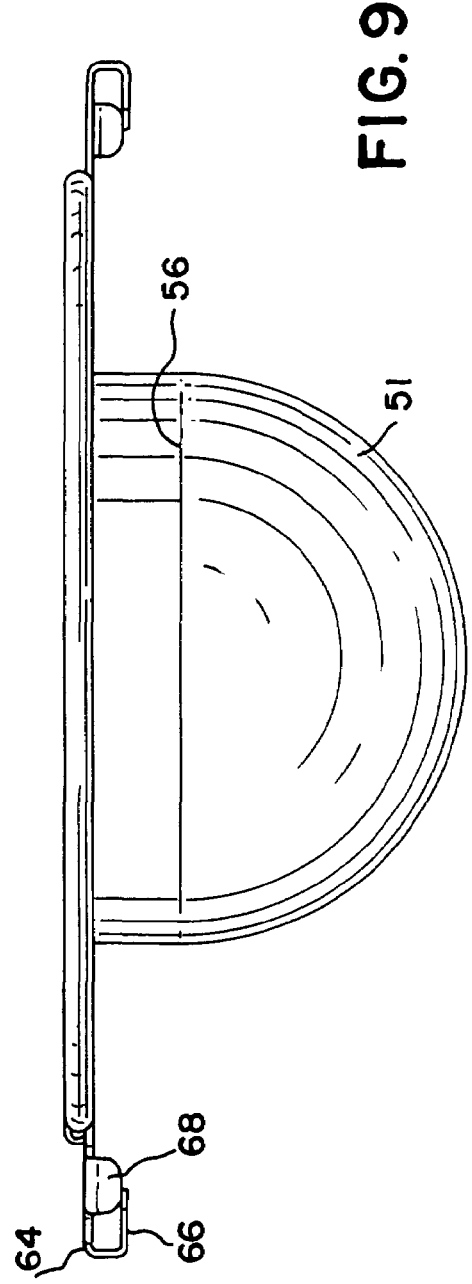

MULTIPLE CAKE BAKING ASSEMBLY

CROSS-REFERENCE TO RELATED APPLICATIONS

This is a continuation-in-part application of U.S. patent application Ser. No. 10/330,221 filed Dec. 30, 2002 now U.S. Pat. No. 6,851,352; U.S. patent application Ser. No. 10/365,422 filed Feb. 13, 2003 and; U.S. patent application Ser. No. 10/424,764 filed Apr. 29, 2003 which is a continuation-in-part application of U.S. patent application Ser. No. 10/302,903 filed Nov. 25, 2002.

TECHNICAL FIELD OF THE INVENTION

The present invention relates generally to the field of cake baking and desert molds. More particularly, the present invention concerns an apparatus for baking multiple individual sized cakes or molded desserts having nested concentrically shaped components with optional fluted inserts. The present invention is directly related to an apparatus assembly for baking multiple shaped individually sized combination dessert mold.

The present invention is thus directed toward an apparatus for molding cake batter, ice creams, gelatins or other desserts into multiple units having an outer shape with an inner separate mold having a smaller shape. The invention particularly concerns a tray assembly having circular recesses formed therein which can be used to provide the base for the cakes. A rack holds a plurality of domed shaped bowl assemblies which molds and/or bakes a plurality of cakes or desserts, each being in the shape of a hemispherical dome or fluted bundt type having a second inner composition shaped as a hemispherical dome.

BACKGROUND OF THE INVENTION

Food molds have been used and are well known in the prior art. A common baking pan is a food mold, with an open end, a closed end and a peripheral side wall. The closed end and side wall define a hollow volume that becomes the three-dimensional shape of a food product molded by the baking pan. Multiple cake baking pans are also known and have a tray with a plurality of circular recesses for baking cup cakes and other food items.

Some food pans, such as a baking pan for making angel food cake, have an annular ring shaped with an open end. The hollow volume of the ring is filled with a food composition and then baked. After baking, the pan is inverted to remove the shaped food composition from the open end. Thus, the open end is used to form the bottom of the final food product.

Other food molds have a centrally located indentation at the closed end. With a mold of this type, a first food composition may be placed and formed in the open end and a second food composition may be placed in the complementary shaped indentation at the closed end. This provides an accurate fit for the second filler food composition within the first supporting food composition.

In all baking pans, it is desirable to facilitate the partial escape of moisture from these apparatuses in order to develop a degree of porosity in the final baked product. At the same time, however, the batter must absorb some moisture to prevent excessive dehydration. It therefore becomes necessary to contain the batter at a pressure sufficient to limit the extent to which water is converted to steam, since the batter absorbs steam less easily than water, while allowing for a degree of conversion and escape. The batter must also be contained to prevent the escape of the cake itself due to its expansion during baking.

It can thus be seen that a number of devices have been used in the molding and baking of desserts to obtain molded desserts in a variety of shaped configurations as described in the prior art. However covered dual composition desserts are rare because of the complexity in preparing same. While cakes are commonly referred to in the literature as being domed, in effect this is an occurrence which comes about as the batter expands during baking and does not equate to a hemispherical or semispherical shaped cake or filling.

Historically, it was known in the prior art to bake bread bowls which were semi-spherical loaves of bread into which a cavity was carved for placement of salads or soups. A conventional bread bowl is typically made by forming raw bread dough on the top of a simple inverted bowl which is then placed into the oven for baking. Bread bowls made in this manner often rise from the inverted bowl so that the same presents an uneven appearance, requiring trimming and waste.

Many prior art devices and techniques mold and bake dough of breads, batters of cakes, cookies, and other baked goods into various shapes including containers which may be used to hold other foods. For example, U.S. Pat. No. 4,812,323, issued Mar. 14, 1989, discloses a method for molding and baking cookie dough into a cup shape which can then be used to hold ice cream or other fillings in a similar manner to U.S. Pat. No. 3,296,956, issued Jan. 10, 1967, which also discloses a molding and baking apparatus for the baking of bread dough into a cup-like shape. U.S. Pat. No. 1,487,906, issued Mar. 25, 1924, discloses a pan for baking cake batter into a container shape for holding ice cream.

In U.S. Pat. No. 3,141,400 issued Jul. 21, 1964 a telescoping cake apparatus is disclosed with a center cone assembly which moves upward when the cake batter is baked forming a frustrum conical cake with a conical center cavity. A one piece strip cross link handle is secured to the upper edge of top of the expendable baking section and the cone by staples or the like.

A baked layered product with an apparatus for making same is shown in U.S. Pat. No. 3,831,507, issued Aug. 27, 1974. This baking assembly uses three baking pans to form a cylindrical bunt bowl body and lid which is placed over the body to hold the filling therein.

Similarly U.S. Pat. No. 1,852,966 issued Apr. 5, 1932 is directed toward a baking pan used for baking a cake with a hollow center so that the same can have a filling placed therein. A tapered tubular outer member has a core mold mounted thereon attached to a cover over the top of the tubular outer member.

The use of nested trays for forming shaped multiple individual baked goods is typified by the common muffin tray. Stacked or nesting trays for forming shaped baked goods such as bread are shown in U.S. Pat. No. 5,232,609 issued Aug. 3, 1993.

U.S. Pat. No. 5,948,313, issued Sep. 7, 1999 is directed toward a mold assembly for making a baked edible shell. The mold assembly is constructed of an outer mold shell and an associated inner mold shell, the outer mold shell having a curved main portion with a central opening and an outer rim extending in a plane. The inner mold shell has a curved main portion with a central chimney shaped to pass through the outer mold central opening. The outer mold opening comprises a raised circular rim with an inwardly directed flange. The outer edge of the outer mold shell is formed with a rolled-up rim. When the edible material is being cooked, a metal strip with curved ends is mounted over the rolled rim of the outer shell mold as seen in FIGS. 4 and 5C to hold both mold-shells in relative positions to eliminate expansion of the edible material during cooking.

Another reference, U.S. Pat. No. 5,226,352 issued Jul. 13, 1993 is directed toward a baking assembly which has an outer dome shaped member and an inner dome shaped member as shown in FIGS. 6 and 7. A flange extends outward from the upper edge of the outer dome member to seat the flange extending from the upper edge of the inner dome member. The flanges are held together by a C clamp or other fastening means. The inner dome shaped member is TEFLON® coated on its inside surface and outside surface allowing cake or dough to be baked in the outer dome mold and the inner mold.

Hemispherical shaped or dome cakes having dual composition are popular in Italian dessert cooking and are generally known as "Zuccotto". These cakes are prepared by slicing previously baked sponge cake (Pan di Spagna) into thin, vertical slices, lining the interior of a bowl with plastic wrap and lining the plastic wrap in the bowl with overlapping pieces of the sponge cake slices. The slices of cake are then sprinkled with liquor and the dampened assembly is then covered with a plastic wrap and refrigerated. A center mixture of chocolate or other filling is poured into the cake lined bowl and the bottom or exposed surface of the filling is covered with other slices of cake. The entire cake is allowed to set for a number of hours, preferably overnight, inverted onto a platter and dusted with confectioners sugar. As can be seen, the process for making this cake is quite laborious in time and resources required. It has been found desirable to mold or form desserts or cake into a layered hemispherical or semi-spherical dome shape which can be baked and/or frozen and marketed as a specialized cake shape similar to that of the Italian "Zuccotto" cakes as the same make an elegant presentation.

The present invention also solves the complex construction problems in assembling multiple domed compound cakes or desserts suitable for individual servings through the use of a rack and bowl assembly which orients and seats the baking bowls in a fixed relationship with each other.

SUMMARY OF THE INVENTION

The present invention is directed toward an apparatus for simultaneously producing individual dual composition desserts or cakes using a baking pan with multiple recesses for the bottom layer or base of the cakes. A rack with individual bowls assemblies being secured to the rack is used to form the rest of the desserts. The handles of the bowl assemblies extend over the top of the rack with the bases of the bowl assemblies extending below the bottom of the rack. The handles receive cover members having an inner bowl construction which fits into the cavity of the outer bowl secured to the rack. The combined cake sections from each of the outer and inner bowls form a dessert which can selectively have an outer fluted shape or an outer semi-spherical shape configuration. A locking mechanism locks the handles of the lower bowl and the cover into fixed positions.

It is an object of the invention to prepare two different composition food products into multiple individual shaped foodstuffs.

It is another object of the invention to provide a cooking assembly for baking multiple individual uniformly shaped dome or fluted shaped cakes with an internal composition of a smaller dome shape than that of the external shape that is resistant to tilting and rolling.

It is still another object of the invention to provide a cooking assembly which delivers heat energy evenly to all areas of the multiple individual sized cakes.

Yet another object of the invention is to provide a cooking assembly that is easy to use, ruggedized and reliable.

It is a further object of the invention to mold multiple food products made of cake batter or a dessert composition in a desired shape and bake or set the compositions while maintaining heat and pressure at a precise desired level.

It is yet another object of the invention is to provide a cooking assembly which is easily broken into individual components and is easy to clean.

Another object of the invention is to provide a cooking assembly for simultaneously baking multiple food products formed of two cakes of different sizes with one cake fitting into a hemispherical cavity formed during the baking process in the outer cake to produce a plurality of uniform cakes that are predictable and reproducible without size variance.

Still another object of the invention is to provide a cooking assembly that has one or more of the characteristics discussed above but which is relatively simple to use and requires a minimum of cooking skills.

In the accompanying drawings, there is shown illustrative embodiments of the invention from which these and other objectives, novel features and advantages will be readily apparent.

These and other objects, advantages, and novel features of the present invention will become apparent when considered with the teachings contained in the detailed disclosure along with the accompanying drawings.

BRIEF DESCRIPTION OF THE DRAWINGS

FIG. 3 is an enlarged cross sectional view of the assembly taken along line 3'—3' of FIG. 2;

FIG. 5 is an enlarged side view of the mold assembly shown in FIG. 4;

FIG. 7 is an enlarged cross sectional view taken along line 7'—7' of the cake bowl assembly of FIG. 6;

FIG. 9 is an enlarged side elevational view of the individual cake bowl assembly shown in FIG. 8.

DETAILED DESCRIPTION OF THE INVENTION

The preferred embodiment and best mode of the invention is shown in FIGS. 1 through 5 with the individual cake bowl assemblies and components of the same used in the mold assembly shown in FIGS. 6–10. The term "batter" as used herein in the application is meant to encompass cake batter, dough, malleable ice cream, gelatin or a malleable dessert which sets up in a rigid or semi-rigid shape.

Referring to the Figures, a mold baking assembly 20 according to the invention is adapted to shape or mold cake batter for multiple individual dome cakes or other multiple compositions of baking goods or complimentary desserts such as ice cream, gelatins, puddings into a concentric domed layered dessert having a semispherical or hemispherical shape.

Figure 1:
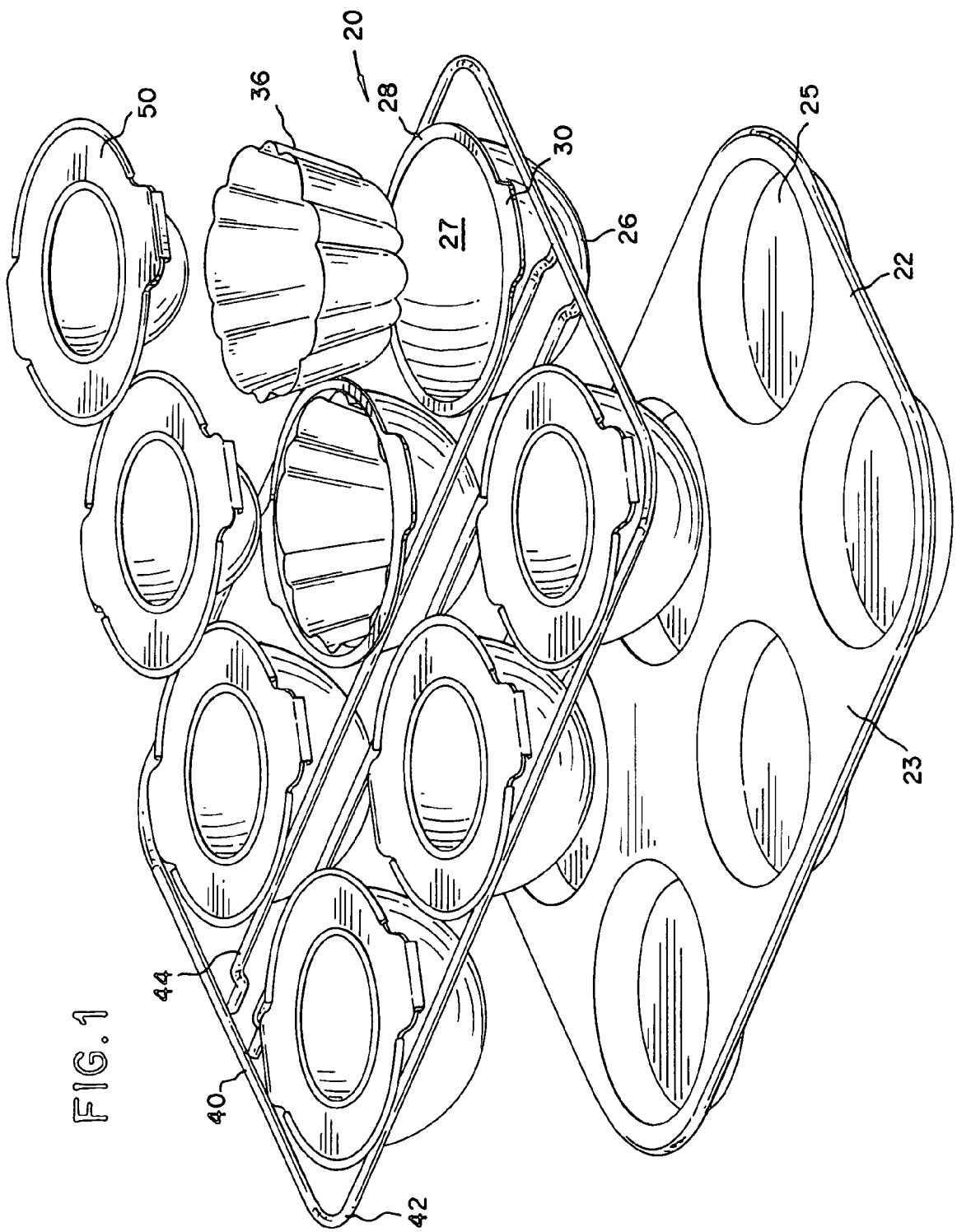
FIG. 1 is an exploded perspective view of the tray, rack and individual cake bowl components of the present mold assembly.
Figure 2:
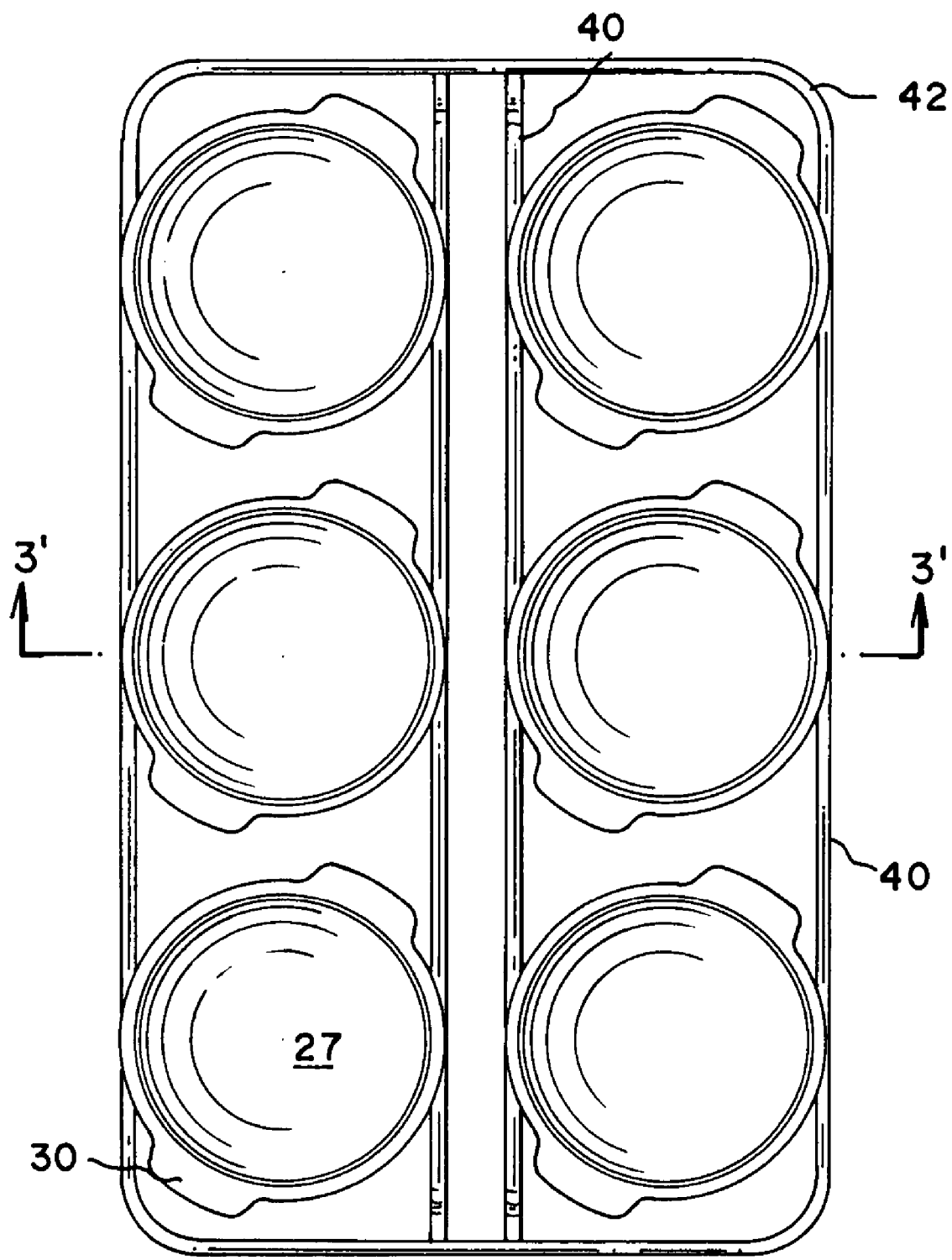
FIG. 2 is a top plan view of the nested cake bowls of the mold assembly of FIG. 1.
Figure 4:
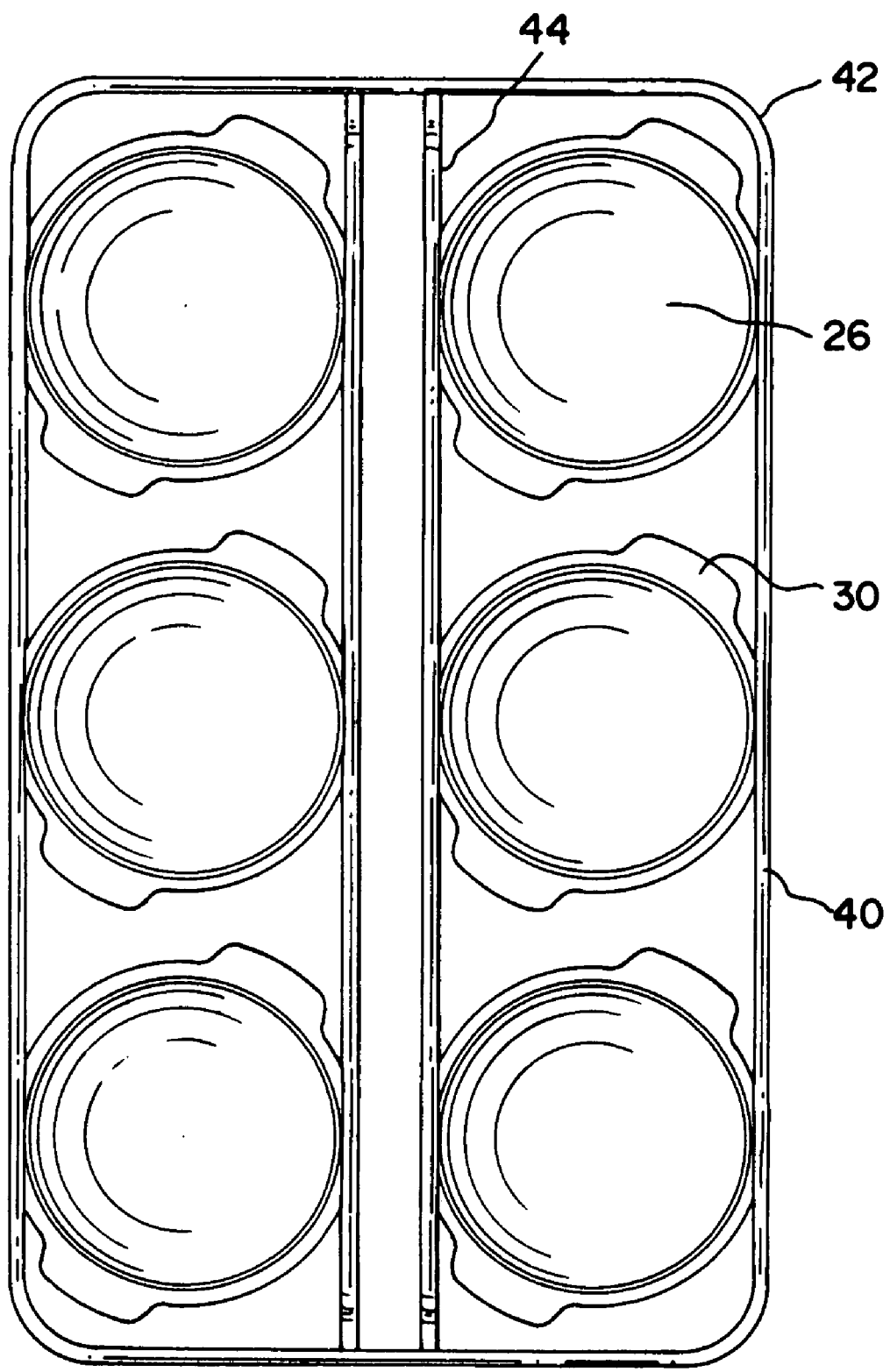
FIG. 4 is a bottom plan view of the mold assembly of FIG. 1.

The baking assembly 20 is constructed with a bottom rectangularly shaped planar base tray or sheet 22, formed of a planar sheet body 23 having a plurality of recesses or chambers 25 formed in the tray to hold batter which when bakes forms the bottom of individual cakes. A plurality of dome shaped bowl assemblies 24 are secured by welding in a rectangular wire rack 40 having rounded ends 42 and a plurality of center support members 44 welded to the rack 40. The rack body and the center support members lie in the same horizontal plane and allow the assembly to be placed into an oven. Each dome bowl or mold assembly 24 has semicircular bowl body 26 with an outer seating and indexing lip 28 and extending opposing handle flanges 30. A fluted bowl liner 36 as shown in FIG. 1 is adapted to be selectively seated in the chamber 27 of the bowl body 26 and a cover assembly 50 is adapted to be mounted on the handle flanges 30.

Figure 6:
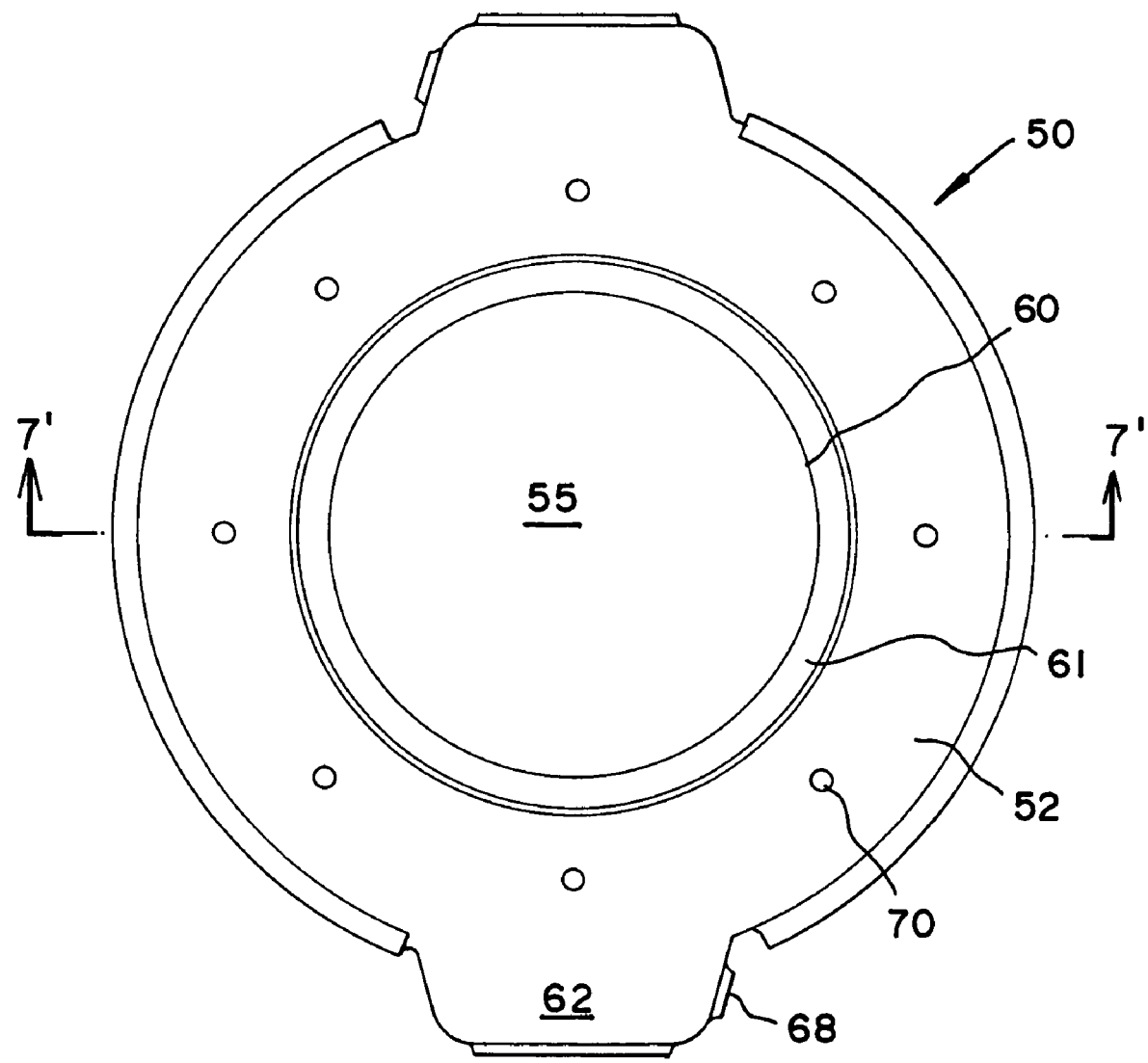
FIG. 6 is a top plan of an individual cake bowl assembly shown in FIG. 1.
Figure 10:
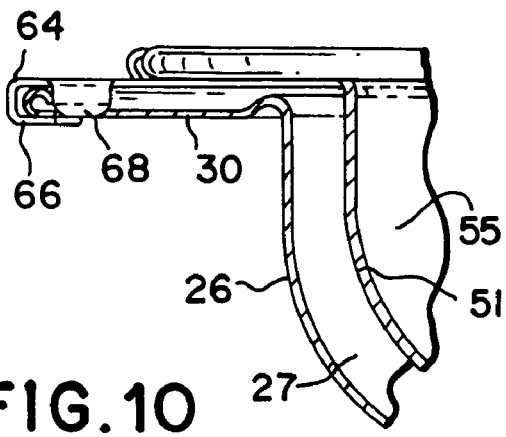
FIG. 10 is an enlarged partial cross sectional view of the cover assembly locking handle over the outer bowl handle.
Figure 8:
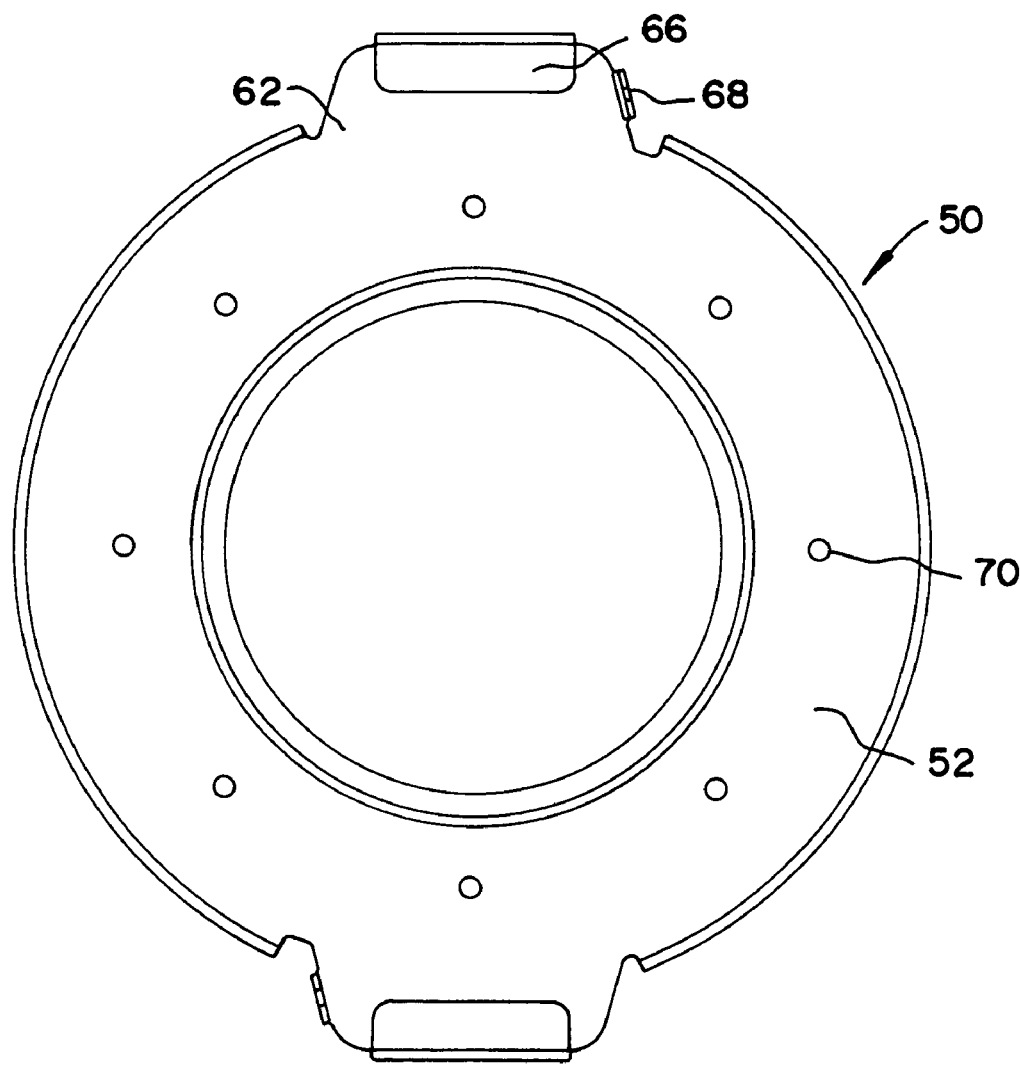
FIG. 8 is a bottom plan view of the individual cake bowl assembly shown in FIG. 6.

The cover assembly 50 has an integral curved bowl 51 with an outwardly extending skirt portion 52 as shown in FIGS. 6 through 9. The inner dome bowl 51 is typically symmetrical with a concavo-convex spherical shape constructed with a bowl body having a spherical or curved closed bottom surface 54 and an open end 60 defined by lip 61 to form chamber 55. The bowl body extends away from cover 50 allowing it to be seated in chamber 27 of the exterior or outer bowl body 26. The cover assembly 50 is substantially circular shaped with a planar skirt 52 provided with integral opposing handles 62 which are shaped to fit over the outer bowl handles 30. The skirt covers cavity 27. The ends 64 of the handles 62 are rolled or bent in a "C" configuration as shown in FIG. 9 so that the bottom portion 66 fits under the lower surface of handles 30 of the bowl 26 and when rotated, locks the same in a fixed position. At the end of each handle end 64 is an integral stop tab 68 that extends downward past the center of the "C" configuration as is shown in FIGS. 8 and 9 which engages end surface 31 of bowl handle 30 as is shown in FIG. 1 to position the cover handles 62 on the bowl handles 30. Each stop tab 68 is positioned in a reverse orientation from that of the opposing stop tab so that the cover assembly 50 can be rotated on the bowl body 26 and locked into position on the bowl body. A plurality of throughgoing apertures 70 are spaced in a circular configuration around the cover 51 through in the skirt portion 52 as shown in FIGS. 6 and 8 to allow steam to escape from the cake batter during the cooking process.

The bowls and tray are preferably constructed of integrally constructed of sheet steel or stainless steel but can be constructed of copper, aluminum, cast iron, pyrex, glass, porcelain, ceramic or any type of microwaveable material at a uniform desired thickness commonly used for baking pans and containers. If desired, the bowl body can have its external surface coated with a non-corroding material such as tin or chromium. The tray and its respective recesses may be constructed of a single sheet of metal formed into the desired shape. The inside and outside smooth surface of each bowl 26, the inner and outside surfaces of the fluted bowl liner 36, the inner and outside surfaces of cover assembly 50 and cover bowl 51 of the cover assembly and the surfaces of the tray 22 are preferably coated with one or more nonstick coatings, such as for example TEFLON® (i.e., fluorocarbon polymers), (e.g., tetrafluroethylene and fluorinated ethylene propylene) in the preferred embodiment to ease the removal of the baked or chilled product from the bowl. It will be appreciated by those skilled in the art that other shapes and geometries of pan assemblies are possible, and that the specifics of material of which it is made can be changed without departing from scope of the invention. For example, the mold in the tray may be formed as a cone, or other shape. Additionally, it can be stamped from a solid piece of material or spun from aluminum instead of formed from a sheet.

If desired, the trays and associated bowl shaped recesses can be constructed of porous material such as high temperature TEFLON® coated high temperature fiberglass ranging from 5 to 10 mils in thickness or a stainless steel wire cloth also TEFLON® coated on both sides, both of which are breathable an allow an air flow of 50 CFM which vents moisture during baking without batter coming through. The porous material has a sieve opening for the stainless steel wire cloth ranging from 0.0165 + or −0.0005 and the stainless steel is STME 1187. The inside and outside surfaces of the bowls and their associated planar surfaces are preferably coated with one or more nonstick coatings, such as for example TEFLON® (i.e., fluorocarbon polymers), (e.g., tetrafluroethylene and fluorinated ethylene propylene). Alternately, the tray and associated bowls can be constructed of sheet steel, stainless steel, copper, aluminum, cast iron, pyrex, glass, porcelain, ceramic or any type of microwaveable material at a uniform desired thickness commonly used for baking pans and containers.

As previously noted, the interior surface and outside surface of the each bowl configuration which contacts the batter or dessert composition is smooth and is covered with TEFLON® in the preferred embodiment to ease the removal of the baked or chilled product from the bowl. The radial sloping of the inner wall of the bowl recess further eases removal of the final dessert composition. It will be appreciated by those skilled in the art that other shapes and geometries of pan assemblies are possible, and that the specifics of material of which it is made can be changed without departing from scope of the invention.

In operation cake batter is poured into the recesses 27 of the tray 22 and into in each bowl chamber about ⅔ to ¾ full. A second cake batter of a different flavor as for example chocolate is poured in the chambers of bowls in the top sheet about ⅔ to ¾ of the depth of each bowl. The pour line is marked by marking indicia 56 around the interior chamber of the bowl.

After the batter is molded and baked by the application of heat to the tray 22 and the rack 40 and its associate bowl assemblies, the tray 22 and rack 40 are removed from the oven. The cover assembly 50 is rotated from the locked position on handles 30 of each outer bowl 26 leaving cavities in each individual cake of the outer bowl 26. If the fluted insert 36 is used, the cake baked in insert 36 is removed. The TEFLON® coating of the interior and exterior surface of the inner mold bowl 51 facilitates removal of the mold without tearing or damaging the final baked product located in chamber 27 of outer bowl 26. The smaller baked interior cake is then removed from cavity 55 of the inner mold bowl body 51, the TEFLON® coating of the interior surface of the inner bowl mold facilitating the dessert removal. The TEFLON® coating of the interior surface of the outer dome mold bowl 24 facilitates removal of the baked product without tearing or damaging the final baked product. The interior cake or other optional filling taken from cavity 55 is then placed in the respective cavity formed in the outer bowl cavity 27 by inner mold bowl body 51 and the composite assembly is inverted onto a serving area for frosting, icing or other decoration preparatory to being served. The result is a dual composition cake or dessert which is domed shaped or fluted and ready to eat. The baked goods may be filled or coated with ice cream, pudding, icing or other sweet filling for a dessert pastry.

Although aluminum, sheet steel and/or stainless steel is preferred for the outer bowl body, any suitable structural material, as previously identified, could be used in its place. The inner bowl body has the same material as that of the outer body.

The principles, preferred embodiments and modes of operation of the present invention have been described in the foregoing specification. However; the invention should not be construed as limited to the particular embodiments which have been described above. Instead, the embodiments described here should be regarded as illustrative rather than restrictive. Variations and changes may be made by others without departing from the scope of the present inventions defined by the following claims.

What is claimed is:

1. An apparatus assembly for forming a plurality of individual compound desserts in a predetermined shape comprising:
a substantially rectangular shaped rack member, said rack having a wire body which is substantially rectangular in shape with rounded corners and a plurality of support members secured to said wire body, said wire body and said support members being in the same plane, a plurality of bowl assemblies secured to said rack member, each of said bowl assemblies comprising an outer bowl member with a closed semi-spherical end and an open end defining a cavity and opposing handles, and a cover member mounted to said outer bowl, said cover member defining a inner bowl which is seated in said outer bowl cavity and a skirt surrounding said bowl, said skirt defining a plurality of throughgoing holes and being provided with mounting means to secure same to said outer bowl member, an open ended fluted insert member mounted in said outer bowl member cavity with the open end adjacent said inner bowl when said bowl assembly is assembled, at least an inner surface of said outer mold bowl and an inner and outer surface said inner mold bowl being coated with a nonstick material.

2. An apparatus assembly as claimed in claim 1 for forming multiple individual compound desserts wherein said mounting means of said skirt are C shaped flanges adapted to fit over handles formed on said outer bowl.

3. An apparatus assembly as claimed in claim 1 for forming a plurality of individual compound desserts in a predetermined shape wherein said nonstick material is tetrafluroethlene.

4. An apparatus assembly as claimed in claim 1 for forming a plurality of individual compound desserts in a predetermined shape wherein said nonstick material is fluorinated ethylene propylene.

5. An apparatus assembly as claimed in claim 1 for forming a plurality of individual compound desserts in a predetermined shape wherein said bowl assemblies are constructed from a group of materials consisting of porous fiberglass, copper aluminum, pyrex, glass, porcelain, ceramic, steel, cast iron, and stainless steel wire cloth.

6. An apparatus assembly for forming a plurality of individual compound desserts in a predetermined shape comprising:
a substantially rectangular shaped base tray with a plurality of preformed recesses, a rack member, a plurality of bowl assemblies secured in a fixed position on said rack member, each of said bowl assemblies comprising an outer bowl with a closed semi-spherical end and an open end defining a cavity and opposing handles, and a cover member mounted to said bowl, said cover member defining a bowl which is seated in said cavity and a skirt surrounding said bowl, said skirt defining a plurality of throughgoing holes, handles and fastening means allowing said skirt handles to be mounted to said outer bowl handles.

7. An apparatus assembly as claimed in claim 6 for forming a plurality of individual compound desserts in a predetermined shape including an open ended fluted insert member mounted in said outer bowl member cavity with the open end adjacent said inner bowl when said bowl assembly is assembled.

8. An apparatus assembly for forming a plurality of individual compound desserts in a predetermined shape comprising:
a substantially rectangular shaped a rack member, a plurality of bowl assemblies secured to said rack member, each of said bowl assemblies comprising an outer bowl member with a closed semi-spherical end and an open end defining a cavity and opposing handles, an open ended fluted insert member mounted in said outer bowl member cavity and a cover member mounted to said outer bowl, said cover member defining a inner bowl which is seated in said outer bowl cavity and the open end of said fluted insert member and a skirt surrounding said bowl, said skirt defining a plurality of throughgoing holes and being provided with mounting means to secure same to said outer bowl member.

* * * * *